(12) United States Patent
Schwerha

(10) Patent No.: US 11,690,393 B2
(45) Date of Patent: Jul. 4, 2023

(54) FOOD MATERIALS

(71) Applicant: NUTRIFECTIONS SERVICES LLC, Belle Vernon, PA (US)

(72) Inventor: Michele Schwerha, Belle Vernon, PA (US)

(73) Assignee: NUTRIFECTIONS SERVICES LLC, Belle Vernon, PA (US)

( * ) Notice: Subject to any disclaimer, the term of this patent is extended or adjusted under 35 U.S.C. 154(b) by 212 days.

(21) Appl. No.: 16/704,373

(22) Filed: Dec. 5, 2019

(65) Prior Publication Data

US 2021/0169116 A1  Jun. 10, 2021

(51) Int. Cl.
| | |
|---|---|
| A23L 33/185 | (2016.01) |
| A23L 33/21 | (2016.01) |
| A23P 30/10 | (2016.01) |
| A23L 33/115 | (2016.01) |
| A21D 13/80 | (2017.01) |
| A23L 33/19 | (2016.01) |
| A23G 1/30 | (2006.01) |
| A21D 13/062 | (2017.01) |

(52) U.S. Cl.
CPC .......... *A23L 33/185* (2016.08); *A21D 13/062* (2013.01); *A21D 13/80* (2017.01); *A23G 1/30* (2013.01); *A23L 33/115* (2016.08); *A23L 33/19* (2016.08); *A23L 33/21* (2016.08); *A23P 30/10* (2016.08); *A23V 2002/00* (2013.01)

(58) Field of Classification Search
CPC ...... A23L 33/185; A23L 33/19; A23L 33/115; A23L 33/21; A23P 30/10; A21D 13/80; A21D 13/062; A23G 1/30; A23V 2002/00
USPC ...................................................... 426/656
See application file for complete search history.

(56) References Cited

U.S. PATENT DOCUMENTS

2013/0224362 A1 *  8/2013  Beasley ................. A21D 2/186
                                                  426/556

FOREIGN PATENT DOCUMENTS

EP           2939542 A1 * 11/2015  ............. A21D 2/181

* cited by examiner

*Primary Examiner* — Brent T O'Hern
(74) *Attorney, Agent, or Firm* — Ference & Associates LLC

(57) ABSTRACT

An embodiment provides a method for manufacturing a light-colored material for a food product, including: creating a starting light-colored material, wherein the starting light-colored material comprises a protein and a fiber; creating a light-colored material from the starting light-colored material by adding a fat to the starting material; molding the light-colored material to a predetermined shape; and baking the light-colored material to a predetermined temperature.

10 Claims, 1 Drawing Sheet

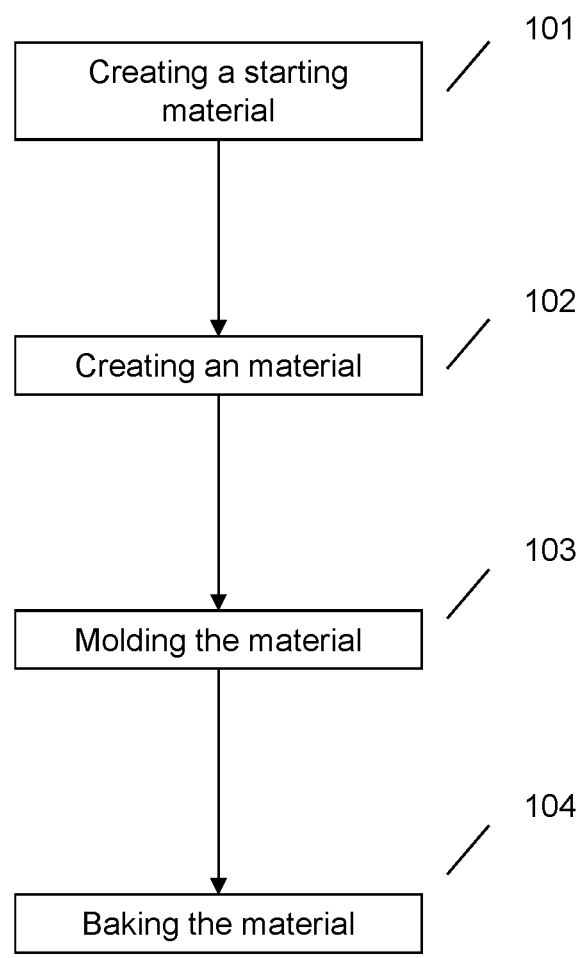

FOOD MATERIALS

FIELD

This application relates generally to food, and, more particularly, to materials for food.

BACKGROUND

Food consumption trends are changing dramatically. Consumers are selecting product with fewer sugars as health concerns awareness increases in the population. Additionally, the rise and awareness of gluten allergies and gluten sensitivity has increased in recent years. Consumers are making healthier choices or food selection for dietary reasons and to maintain a healthy lifestyle. Weight maintenance, diabetes, cardiovascular health, and food allergens provide an impetus for consumer selection of healthier choices.

Trends demonstrate a shift away from food products with added sugar. However, consumers still want a savory food product that comes as close as possible to the less healthy option. The rise of consumer reviews shared online via ratings, social media, and the like allow consumers not only to evaluate new products, but to share their experience with other consumers. Therefore, competition for a healthier and allergy free option that has taste qualities similar to conventional recipes is growing in the food industry.

BRIEF SUMMARY

In summary, one embodiment provides a method for manufacturing a light-colored material for a food product, comprising: creating a starting light-colored material, wherein the starting light-colored material comprises a protein and a fiber; creating a light-colored material from the starting light-colored material by adding a fat to the starting material; molding the light-colored material to a predetermined shape; and baking the light-colored material to a predetermined temperature.

Another embodiment provides a method for manufacturing a dark-colored material for a food product, comprising: creating a starting dark-colored material, wherein the starting dark-colored material comprises a protein and a fiber; creating a dark-colored material from the starting dark-colored material by adding and mixing a fat and a powder to the starting material; molding the dark-colored material to a predetermined shape; and baking the dark-colored material to a predetermined temperature.

A further embodiment provides a light-colored material for a food product, comprising: a protein; a fiber; a flavoring; an oil blend comprising a low point melt palm oil and a high point melt palm oil; and a spray dried calcium caseinate; wherein the light-colored material is molded to a shape; and wherein the light-colored material is baked and, after baking, maintains a light-color.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 1 illustrates a flow diagram of an example food material.

DETAILED DESCRIPTION

It will be readily understood that the components of the embodiments, as generally described and illustrated in the FIGURES herein, may be arranged and designed in a wide variety of different configurations in addition to the described example embodiments. Thus, the following more detailed description of the example embodiments, as represented in the FIGURES, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

Food materials may be a component of a food. Materials may add taste, crunchiness, softer morsels, texture, and/or appearance to a food product. Traditional forms of food materials may have included ingredients such as raisins, chocolate, sugary chunks, or the like. Food materials allow a food manufacturer to provide a unique product capable of differentiating the product from other food options While these conventional materials do add taste, they do have many drawbacks. For example, conventional food materials may add "empty calories" which may refer to calories with little to no nutritional value. Conventional materials may also add sugars. Consumers are shying away from sugars to improve nutritional value. Some consumers have dairy restrictions and/or lactose intolerance. Conventional materials may also contain gluten. Consumers with gluten allergies, sensitivity, or dietary choices may be eliminating gluten altogether. Food manufacturers are seeing a shift in consumer habits. Consumers are buying less food products with the ingredients of conventional materials. Also, consumers are reading food labels and comparing them to other options.

Consumers are looking for healthier options in their food. These healthier options may include fiber, protein, and low or no sugar foods. However, manufacturing food materials with healthier ingredients may be difficult. For example, consumers still require a taste similar to the conventional material. As another example, consumers still prefer a texture and consistency similar to a conventional material. The consumer preference may be a cookie-like taste and/or consistency. And as a further example, consumers prefer a material with the appearance similar to the conventional material. Creating a light-colored material can be difficult. What is needed is a method for manufacturing a food material with attributes preferable to the consumer which may include taste, texture, color, or the like.

Accordingly, the methods described herein provide a technique for manufacturing a material for a food product. Specifically, methods as described herein may use protein and/or fiber as a main ingredient. In an embodiment, the protein may be up to 38% by volume in the material. Other protein percentages may be possible using the methods described herein. The material may not include wheat, gluten, dairy, or eggs. The material may be vegan. In an embodiment, the material may have very little or no sugar. The material may be a light or a dark color. A method of manufacturing may be different for a light or dark-colored material. In an embodiment, the ingredients may be dried using a spray drying process. The material may be manufactured to any size or shape depending on the need for a final food product. The material may be manufactured and used at a later time for use in a final food product.

The illustrated example embodiments will be best understood by reference to the figures. The following description is intended only by way of example, and simply illustrates certain example embodiments.

Referring now to FIG. 1, an embodiment uses a method to manufacture a material for a food product. The material may be gluten free, no sugar added, wheat free, egg free, no sugar added, low sugar, non-dairy, vegan, or a combination thereof. The material may contain protein. The non-dairy and/or vegan embodiment may use pumpkin, rice, hemp, and/or a pea protein as an ingredient. The non-dairy and/or vegan embodiment may use other sources of protein that conform to the dietary definition of non-dairy and/or vegan. The material may contain fat. The material may include fiber. The material may have a cookie-like taste and/or consistency. The material may be manufactured into small pieces and placed in a food product.

At 101, in an embodiment, a starting material may be created. The starting material may be a dark-colored material or a light-colored material. Example embodiments of the dark-colored and light-colored material are described below.

In an embodiment, the method may be used to manufacture a dark and/or a light-colored material. The ingredients may be different between the dark and light-colored material. In an embodiment, a different composition of protein and fats may be used to yield a different color. Different colors may include black, gray, white, yellow, golden, or the like. Other colors may be manufactured using colored ingredients. The composition of proteins and fats may yield a different color.

In an embodiment a fat and/or a powder may be added to create a starting material. The powder may be flax. In an embodiment, flax and water may be mixed. Ingredients may be mixed by a mixer, by hand, or the like. The water and flax may be allowed to congeal. The water and flax may achieve a homogenous putty-like consistency. A sugar substitute or low sugar may be added to the flax and water mix. The sugar substitute may be in many forms. For example, erythritol and inulin isomalto-oligosaccharides (IMO) may be used for sweetening. The sweetener with the flax and water may be creamed or beat. Fat may be added to the mix. And protein may be added to the mixture as well. Liquid fiber or fiber may be added. At this point the mixture may go to a machine.

At 102, a material may be created. The dark and light-colored material may have different compositions or ingredients. In an embodiment, the dark-colored material may have a composition of protein and fat. The dark-colored may contain calcium caseinate. The dark-colored may contain a lower melt point palm fat. The dark-colored may contain coca powder. The coca powder may maintain the dark color. The dark-colored material may be used as a material to replicate a chocolate piece, a raisin, or the like. The dark-colored material may be flavored to a desired taste.

In an embodiment, the light-colored material may contain a spray-dried lecthinated protein. The light-colored material may contain a high melt palm fat. The light-colored material may contain low melt palm fat. The light-colored material may contain fiber. The light-colored material may be flavored to a desired taste.

At 103, in an embodiment the material may be molded. The molding may be performed in a variety of ways. The molding may be performed using a rotary molding device. For example, the material may be squeeze between two rollers. The rollers may have indentations. The indentations may correspond to a desired shape of the material. For example, the indentation may be shaped as a star, circle, broken cookie bit, or the like. The molding process may be similar to a pasta maker that may form the pasta material into a particular cross section. Additionally or alternatively, the material may be sheared into chunks or pieces. The pieces may be of uniform size, varying size, or a combination thereof.

At 104, in an embodiment, the material may be baked. Baking temperature and durations may be selected on the type of material and the desired consistency of the baked product. Cooking time may be longer for a dark-colored material as compared to the light-colored material. In an embodiment, the dark-colored material may be crunchy, but may be soft with a shorter baking time. In embodiment, the light-colored material may be soft, but may be harder or crunchy if baked for a longer time.

In an embodiment, the material may be used in a food product. The material may be used immediately or soon after manufacture. The material may be stored, frozen, shipped, or the like for use at a later time in a food product. The material may be used in a food product such as, but not limited to nutrition bars, snacks, ice-cream, crumbles in yogurt, or the like. The methods described herein describe a novel way to manufacture material for food manufacturing. The material may provide for healthier and/or allergy safe options for consumers.

It is noted that the values provided herein are to be construed to include equivalent values as indicated by use of the term "about". The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying FIGURES, it is to be understood that this description is not limiting and that various other changes and modifications may be affected therein by one skilled in the art without departing from the scope or spirit of the disclosure.

What is claimed is:

1. A method for manufacturing a molded, baked food material to be included in a food product, comprising:
creating a starting material, wherein the starting material comprises a protein added to an amount of water and flax, wherein the amount of water and the flax are allowed to congeal;
creating a food material from the starting material by adding and mixing a fat and a powder to the starting material;
molding the food material to a predetermined shape; and
baking the food material to a predetermined temperature;
a size of the food material after the baking being pieces for inclusion within the food product.

2. The method of claim 1, wherein the food material does not contain wheat, egg, gluten, or added sugar.

3. The method of claim 1, wherein the food material comprises a vegan protein.

4. The method of claim 1, wherein the fat comprises a palm fat.

5. The method of claim 1, wherein the powder comprises a coca powder.

6. The method of claim 1, wherein the creating the food material further comprises adding and mixing calcium caseinate.

7. The method of claim 1, further comprising adding a sweetener comprising inulin isomalto-oligosaccarides (IMO) during the mixing of the fat and powder with the starting material.

8. The method of claim 1, wherein the molding comprises rotary molding the food material into a plurality of shaped pieces.

9. The method of claim 1, further comprising adding a flavoring to the food material.

10. The method of claim 1, wherein the food material does not contain gluten, wherein the molding comprises rotary molding the food material into a plurality of shaped pieces.

* * * * *